United States Patent
Porter et al.

(10) Patent No.: US 8,732,695 B2
(45) Date of Patent: May 20, 2014

(54) METHOD OF DISTRIBUTING SOFTWARE AND SUPPLEMENTAL DISPLAY DATA TO A CLIENT DEVICE

(75) Inventors: Robert Mark Stefan Porter, Winchester (GB); Clive Henry Gillard, Alton (GB); Simon Dominic Haynes, Fleet (GB); Henry Epsom, Newbury (GB)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 12/674,196

(22) PCT Filed: Aug. 29, 2008

(86) PCT No.: PCT/GB2008/002931
§ 371 (c)(1),
(2), (4) Date: Feb. 19, 2010

(87) PCT Pub. No.: WO2009/027689
PCT Pub. Date: Mar. 5, 2009

(65) Prior Publication Data
US 2011/0138379 A1   Jun. 9, 2011

(30) Foreign Application Priority Data
Aug. 31, 2007   (GB) .................................. 0717020.2

(51) Int. Cl.
*G06F 9/445*   (2006.01)

(52) U.S. Cl.
USPC ........... 717/177; 707/827; 707/828; 717/176; 717/178

(58) Field of Classification Search
CPC .................................. G06F 17/30; G06F 17/00
See application file for complete search history.

(56) References Cited

U.S. PATENT DOCUMENTS

| | | | |
|---|---|---|---|
| 7,093,198 B1 | 8/2006 | Paatero et al. | |
| 7,512,943 B2 * | 3/2009 | Hester et al. | 717/177 |
| 7,844,964 B2 * | 11/2010 | Marolia | 717/172 |
| 8,316,364 B2 * | 11/2012 | Stein | 717/173 |
| 8,341,622 B1 * | 12/2012 | Eatough | 717/177 |
| 2003/0231204 A1 * | 12/2003 | Hanggie et al. | 345/744 |
| 2005/0021935 A1 | 1/2005 | Schillings et al. | |
| 2007/0223703 A1 * | 9/2007 | Verma et al. | 380/278 |
| 2011/0271275 A1 * | 11/2011 | Ochi et al. | 717/177 |

FOREIGN PATENT DOCUMENTS

| | | |
|---|---|---|
| EP | 1 209 561 | 5/2002 |
| EP | 1 489 497 | 12/2004 |
| JP | 2003-532189 | 10/2003 |
| JP | 2004-272438 | 9/2004 |
| JP | 2006-48487 A | 2/2006 |
| JP | 2007-207191 | 8/2007 |
| WO | 03 017077 | 2/2003 |

OTHER PUBLICATIONS

Chinese Office Action Issued Apr. 12, 2012 in Patent Application No. 200880104794.9 (with English translation).

* cited by examiner

*Primary Examiner* — Farhan Syed
(74) *Attorney, Agent, or Firm* — Oblon, Spivak, McClelland, Maier & Neustadt, L.L.P.

(57) ABSTRACT

A method of distributing software and supplemental display data and a client device having the same. The method reduces the cost of providing software to a number of devices on a multi-cast network. The software allows the user to gain access to the multi-cast network, and the supplemental display data is transferred to the client device over the network.

12 Claims, 6 Drawing Sheets

METHOD OF DISTRIBUTING SOFTWARE AND SUPPLEMENTAL DISPLAY DATA TO A CLIENT DEVICE

BACKGROUND OF THE INVENTION

1. Field of the Invention

The present invention relates to a method of distributing software and a client device having the same.

2. Description of the Prior Art

Presently, many electronic devices are run by software code. This software includes all the features required by the electronic device. For instance, the software contains all the components, user interfaces etc required for the electronic device to function.

The software is generated specifically for the electronic device which is to be controlled. This software is then copied using mass production facilities.

However, this approach to software production for electronic devices has several disadvantages which have been addressed by the present invention.

For instance, using the known technique, the size of "run" of the mass production is purely dependent upon the number of devices having exactly the same components and configuration. Therefore, a small number of electronic devices requiring the same components will result in a small run, which means that the cost per piece of software is relatively high.

SUMMARY OF TIM INVENTION

According to one aspect of the present invention, there is provided a method of distributing software used to control a portable client device and supplemental display data operating under the control of the software and used to configure the display of the client device, the client device being connectable to a multi-cast network, the method comprising the steps of:
  providing a pre-recorded recording medium containing the software, said software enabling the client device to connect to the multi-cast network;
  receiving from the multi-cast network, following connection thereto by the client device, said supplemental display data;
  storing, in a data storage device located in the client device, the supplemental display data; and
  graphically representing, on the client device, said supplemental display data using said software stored on the pre-recorded medium.

This is useful because the distribution of software needed to run a client device can be customised. This means that larger production runs of software can take place and so the cost of manufacture is reduced.

The software may comprise an interpreter to run the second software components. This means that network resource is saved because interpreters (which are large files) do not need to be transferred over the network.

The software may comprise a markup language interpreter and the supplemental display data is written in a corresponding markup language.

The software may comprise a user interface skeleton which, when loaded onto the client device, configures the client device to provide user interface functionality. This means that a basic user interface (which is reasonably standard across a number of applications) is stored on the pre-recorded medium and thus does not need to be transferred over a network. Accordingly, this saves network resource.

The supplemental display data may comprise a user interface skin component which, when loaded onto the client device, configures the client device to provide a user interface skin on the user interface skeleton. This allows a level of customisation to the interface, which, in terms of network resource, is not that consuming.

According to another aspect of the present invention, there is provided a portable client device being controlled by software and being connectable to a multi-cast network, the device comprising:
  a network interface operable to be connected to the multi-cast network;
  a pre-recorded data reader operable to read, from a pre-recorded recording medium, said software controlling the client device to connect to the multi-cast network;
  a receiver operable to receive via the network interface and from the multi-cast network following connection thereto by the client device, supplemental display data operating under the control of the software and used to configure the display of the client device;
  a data storage medium located in the client device operable to store the supplemental display data; and
  a display configured to graphically represent said supplemental display data using said software stored on the pre-recorded medium.

The software may comprise an interpreter to run the supplemental display data.

The software may comprise a markup language interpreter and the supplemental display data is written in a corresponding markup language.

The software may comprise a user interface skeleton which, when loaded onto the client device, configures the client device to provide user interface functionality.

The supplemental display data may comprise a user interface skin component which, when loaded onto the client device, configures the client device to may provide a user interface skin on the user interface skeleton.

The data storage medium may be removable from the client device.

BRIEF DESCRIPTION OF THE DRAWINGS

Embodiments of the present invention will now be described, by way of example only, with reference to the following Figures in which.

DESCRIPTION OF THE PREFERRED EMBODIMENTS

Figure 1:
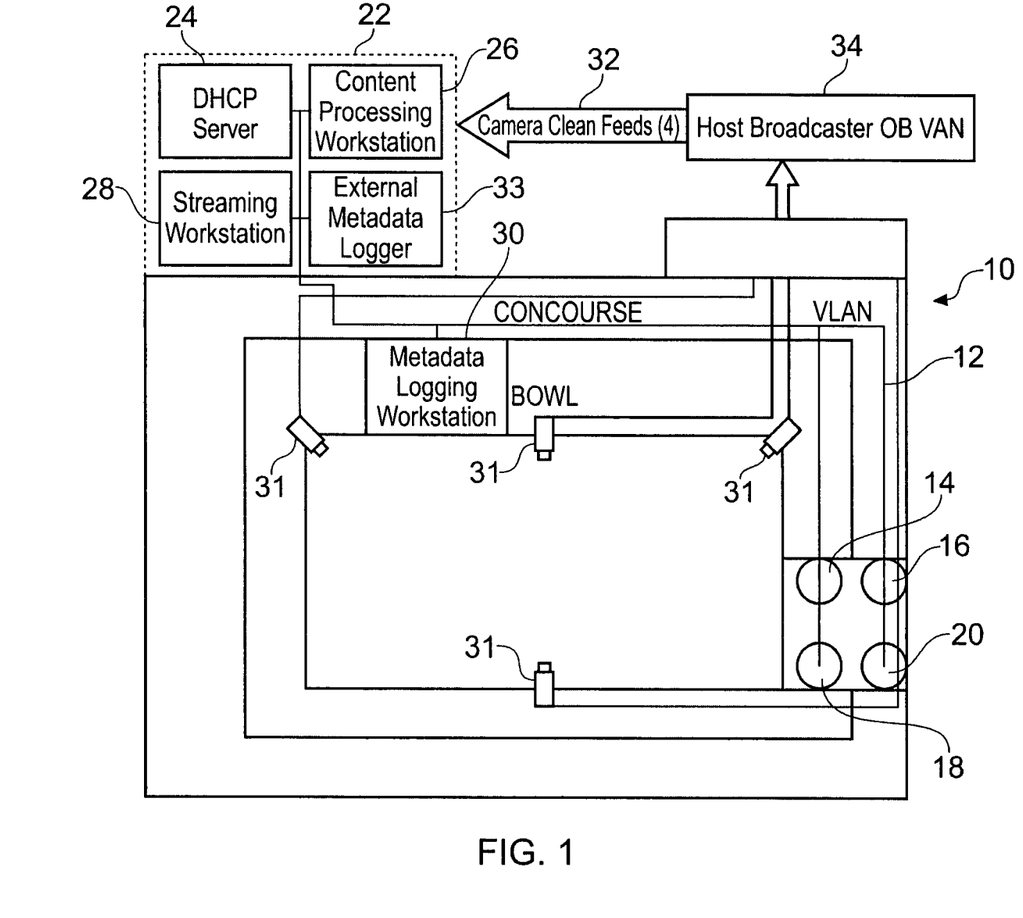
FIG. 1 shows an aerial view of a venue containing a system according to an embodiment of the present invention.

Referring to FIG. 1, which shows an aerial view of a stadium 10 which also includes an outer periphery which is outside of the main stadium building but which is still property of the stadium. The outer periphery may consist of a concourse 12 and car-park (not shown) as well as other features. The stadium 10 is an example of a public event venue and in the embodiment is a soccer stadium hosting a soccer match.

Within the stadium 10, a number of Wireless Network Access Points, (WiFi APs) 14, 16, 18, 20 are provided. In embodiments disclosed hereinafter only four are shown which are located so as to provide Wireless Network access to a number of user devices (not shown in FIG. 1) within a limited region of the stadium 10. However, the skilled person will appreciate that the Wireless Network is scalable in size and/or number of users so that any number of WiFi APs can be provided to cover a greater or less great region or more or less user devices than that shown in FIG. 1. In order to maintain an adequate service to the user devices, each WiFi AP should service no more than 255 user devices. Additionally, adjacent WiFi APs should broadcast data on a different channel to each other. In embodiments, the difference should be 5 channels to reduce the likelihood of an error reduced in the overlap region. Also, it is useful if beam shaped antennae are used in the system to limit overspill of one channel onto the same channel of a different WiFi AP. This overspill can be further reduced by placing different WiFi APs using the same channel for streaming video a greater distance apart.

In embodiments, the WiFi APs communicate with the user devices wirelessly using IEEE 802.11b. However, the invention should not be limited and any other suitable protocol may be used such as IEEE 802.11b/g or IEEE 802.11a. Indeed, the network may be a wired network. Additionally, the WiFi APs encrypt all data transmitted over the network using the WiFi Protected Access (WPA). The WPA key is provided to the user devices using a secure method.

The Wireless Network will be described in FIGS. 1 and 2. However, as an overview, the data that is put on the network is provided by a control room 22 which includes a Dynamic Host Configuration Protocol (DHCP) Server 24, a content processing workstation 26, a streaming workstation 28 and an external metadata logger 33. Additionally provided is an event logging workstation 30. Preferably, the event logging workstation 30 is provided at a commentary position so that the event logging workstation user can view the soccer match. However, it is possible that the event logging workstation 30 is located in the control room 22. Additionally, it is envisaged that the control room 22 will be relocatable, such as an outside broadcast van, although it may be static and located in or around the stadium 10. The arrangement and function of each of these will be explained hereinafter with reference to FIG. 2.

Additionally, the control room 22 includes four video camera feeds 32. These video camera feeds are provided by an Outside Broadcast Van (OB Van) 34 located on stadium property. The OB Van 34 has video feeds from video cameras 31 located around the stadium 10. These video feeds simultaneously capture different views of the soccer match. In the embodiments described below, the video camera feeds are of High Definition Quality (such as 1920×1080 pixels). However, the invention is not so limited and may well be standard definition. The HD quality video feeds will be fed into the control room 22 using the High Definition Serial Digital Interface (HDSDI) standard, although the invention is not so limited.

Typically, the stadium 10 will also provide a video feed to show footage on monitors (not shown) located around the stadium 10. In this case, the stadium 10 may have a separate editing suite (not shown) which provides an edited version of the live video feeds. It may be that this edited version of the live video feeds is provided to the control room 22 in addition to, or instead of, one or more of the live video feeds taken directly from the HD video cameras.

Of course, the video feeds could come directly from the cameras or via the editing suite in either an edited or unedited form.

Figure 2:
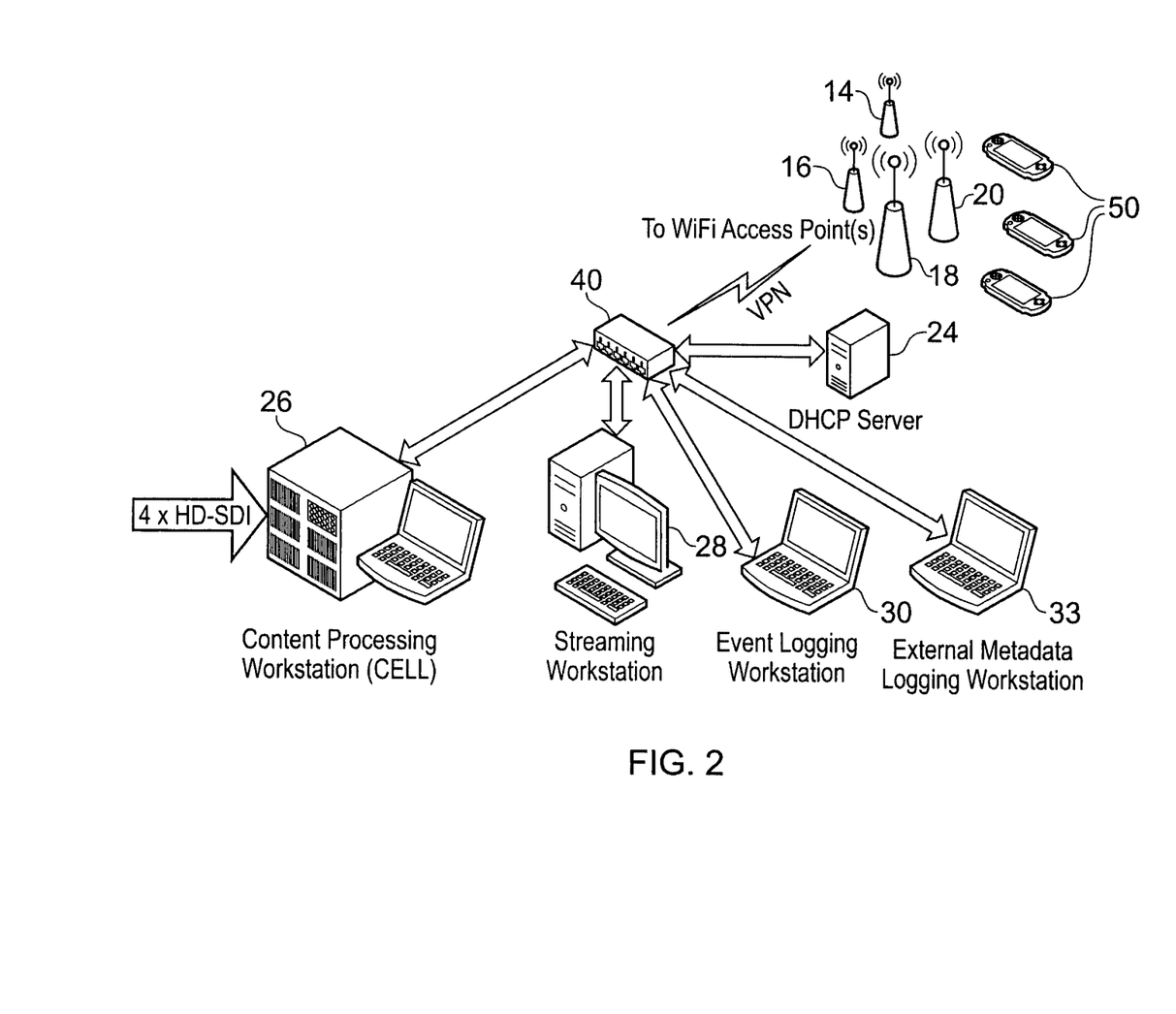
FIG. 2 shows the system according to an embodiment of the present invention.

Referring to FIG. 2, the four input video feeds are fed into the content processing workstation 26. In embodiments, the content processing workstation 26 contains one "Cell"™ processor (not shown). The "Cell"™ processor is used because it is particularly well suited to processing High Definition video images. However, the invention is equally well suited to any type of image processing device, such as a computer graphics card.

Each of the four input live video feeds are then down-sampled to a lower resolution, for example, 480×272 pixels in the content processing workstation 26. This is done using known techniques and to a resolution that is (i) suited to the network over which the video feeds are to be transmitted or broadcast and (ii) suited to the display of the user device which is used to view one of the live video feeds.

The down-sampled live video feeds are then encoded using an encoding technique suited to the user device. In this case, the encoding technique is Advanced Video Coding (AVC), although the invention is not so limited.

The encoded down-sampled live video feeds are fed to the streaming workstation 28. The streaming workstation 28 only allows one of the live video feeds to be transmitted over the Wireless Network. The streaming workstation 28 packetises one of the encoded down-sampled live video feeds for transmission over the network and adds forward error correction (FEC) information to the packets. This allows the selected encoded down-sampled live video feed to be transmitted over the Wireless Network such that minor errors, caused by interference for instance, in the packets received by each user device does not fatally corrupt the encoded down-sampled live video feed. This is particularly useful in a multi-cast system because it is not possible for every user device to acknowledge receipt of each packet because to do so would cause very high levels of data traffic across the network. Forward error correction techniques are known and so will not be explained in detail. It should be noted that although the foregoing is described as only transmitting one packetised live video feed, the invention is not so limited and may allow any number of packetised live video feeds to be transmitted over the network.

Although it may be possible to store all the encoded down-sampled video feeds on the streaming workstation 28, in embodiments, only a predetermined duration of the encoded down-sampled video feeds are stored on the streaming workstation 28. This reduces the amount of storage required. The storage may be situated locally to the streaming workstation 28 or remotely, for instance over a network connection separate to the Wireless Network to which the user devices are connected.

The streaming workstation 28 will be operated by a streaming workstation user. The streaming workstation user will select which of the four live video feeds to packetise and transmit over the Wireless Network. During the course of the match, the user of the streaming workstation 28 may change which live video feed is transmitted over the Wireless Network. For instance, when a certain number of highlight files are generated, the user of the streaming workstation 28 may generate a rolling highlights stream over the network. In other words, the highlight files generated to date may be edited together so as to have the appearance of a video feed. Additionally, the user of the streaming workstation 28 can generate so-called metadata (data about data—which is usually is smaller in size than the data it is representing) in response to events logged by the event logging workstation 30. The user of the streaming workstation 28 will generate a highlight video file from the encoded down-sampled video feeds on the basis of the logged event. The generation of the highlight video file is explained below in the streaming workstation section.

The generated highlight files are then encrypted using the AES encryption algorithm and are loaded onto a data carousel within the streaming workstation 28. Also transmitted by the streaming workstation 28 is an AES decryption key. This AES decryption key is written to memory within a user device 50. The data carousel and metadata generation will be described in detail later.

The content processing workstation 26, streaming workstation 28 and event logging workstation 30 are all connected to a router 40. Additionally connected to the router 40 is the DCHP server 24. The DCHP server 24 allocates an Internet Protocol (IP) Address to each user device 50 when they connect with the Wireless Network. The router 40 is connected to the WiFi APs 14, 16, 18, 20 for broadcast to the user devices 50 located around the stadium 10. The selected live video feed and data from the data carousel (including video highlight files) are multi-cast to each user device 50. Although the DCHP server 24 is described as a separate server, this may be incorporated as functionality into the streaming workstation 28, or indeed router 40.

The router 40 transfers the encoded down-sampled video feeds from the content processing workstation 26 to the streaming workstation 28 as well as the logged event information from the event logging workstation 30 to the streaming workstation 28. Additionally, the router 40 transfers the packetised down-sampled encoded live video feed and the data from the data carousel that is multi-cast from the streaming workstation 28 to the WiFi APs 14, 16, 18, 20. The WiFi APs 14, 16, 18, 20 then multicast this data to each user device 50. Before transmission by the WiFi APs 14, 16, 18, 20, the data is WPA encrypted.

Figure 3:
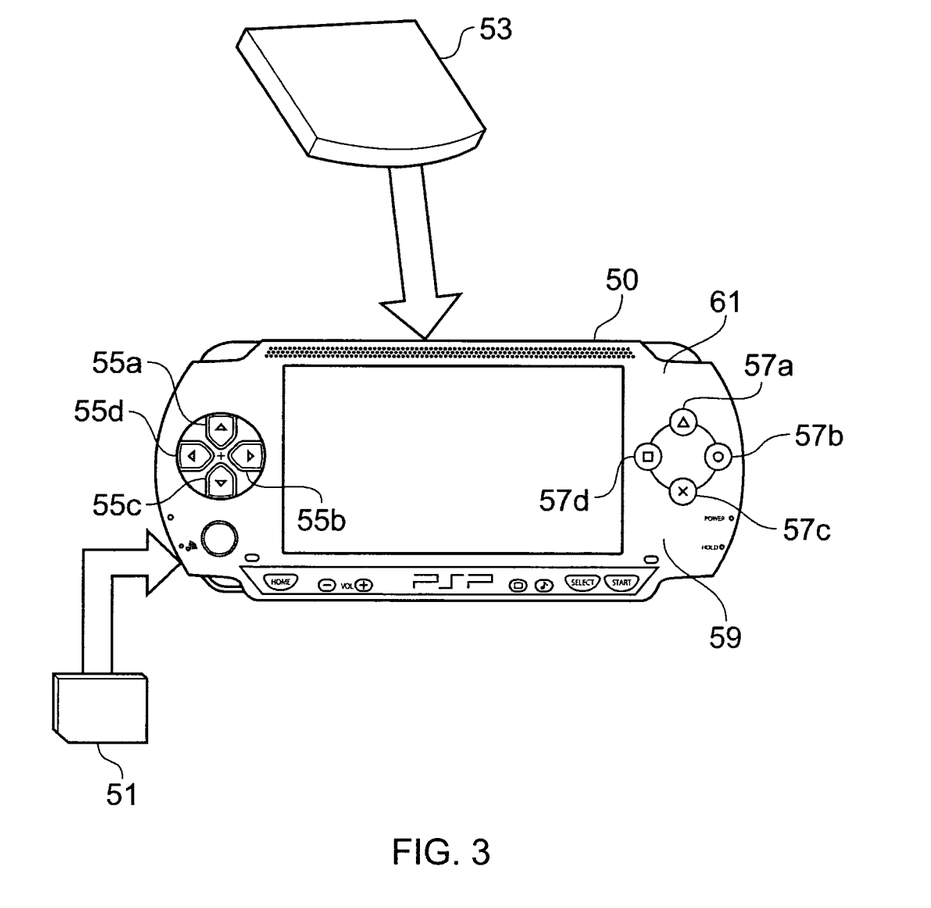
FIG. 3 shows a client device for use in the system of FIGS. 1 and 2.

FIG. 3 shows a user device 50. In the following embodiments the user device 50 is a PlayStation Portable (PSP)® produced by the Sony® Corporation. The PSP is used because it has a display and can be connected to a Wireless Network using an in built IEEE 802.11b connection 61. Additionally, each PSP is provided with a Unique Identification (UID) by Sony® stored on built-in memory 59. By analogy therefore, other suitable platforms for a user device include a mobile (cell) telephone, Personal Digital Assistant (PDA) etc. The PSP is controlled by a processor which runs using software containing computer readable instructions. In the PSP example above, the software is stored on a storage medium which is a Universal Media Disc (UMD)® 53. However, other code used with the UMD 53 is stored on a Memory Stick Pro Duo® 51 or a combination of the two. This type of code may be supplementary display data which is data that does not contain any program libraries, but provides additional functionality to the PSP 50 such as Graphical User Interfaces; extra content and the like. It is also noted that if the user device was a different platform; then other memory platforms may be used. For instance, if the platform was a mobile (cell) telephone, then the memory platform may be a Subscriber Identity Module (SIM) and/or a more generic memory device. In the example of the PSP, as will be explained later, it is advantageous to use a combination of the UMD 53 and the Memory Stick Pro Duo 51. This is because the need to provide different UMDs periodically or for different events (such as live concerts, different sports events etc) is reduced and so reducing cost across the system. Additionally, by using this combination, the flexibility of the system is increased.

Any software stored on the UMD 53 is encoded and encrypted so cannot be accessed and amended by an unauthorised user. This means that the software on the UMD 53 is secure. The WPA key used by the WiFi APs to initially access the Wireless Network is stored on the UMD 53 and is read by the PSP 50. Therefore, only if the correct WPA key is read from the UMD 53 is the user device 50 given initial access to the Wireless Network. However, as is understood by the skilled person, the WPA decryption key may be updated during the match to add an extra layer of security. Additionally, although the UMD 53 is Read-only storage, a Memory Stick Pro Duo 51 can be read from and written to by the PSP 50.

The user can navigate around the interface on the PSP using arrow buttons 55a-55d. The interface consists of a home page containing a number of different categories of interest. Any one of these categories can be highlighted by the user. The selection of the category is made by pressing one of the buttons 57a-57d (a selection button) when a category is highlighted. In embodiments of the present invention, the categories include the live video stream, the highlight video clips (stored as highlight files), match metadata (which will be explained below) and authored content. The match metadata and authored content are stored as eXtended Markup Language files (XML).

If the user selects the live video stream, the video stream chosen by the user of the streaming workstation 28 is viewed by the user of the PSP 50. This is viewed live and is not stored on the PSP 50. It should be noted at this point that even if the user of the PSP 50 is watching the live video stream, the data from the data carousel is still being received by the PSP 50. Data from the received data carousel is stored on the Memory Stick Pro Duo 51. Accordingly, amongst the other data placed on the data carousel, the encrypted video highlight file will also be stored on the Memory Stick Pro Duo 51.

If the user selects the video highlights, the AES decryption key which is received from the streaming workstation 28 over the Wireless Network is used to decrypt the encrypted video highlight files. This will be described in detail below.

If the user selects the match metadata information such as the statistics of the currently played match, team possession, shots at goal (on and off target), goals, player red/yellow cards, corners, throw-ins etc will be displayed.

If the user selects authored content; additional information such as the history of the two teams, information about players (age, nationality, height, goals scored, favourite food etc), remaining fixtures, club shop, special offers, exclusive videos etc will be displayed. The authored content can be generated before the start of the match.

It is also possible that different content may be created so the user may, for example, view match metadata and the live video stream at the same time.

In some embodiments, the user of the PSP 50 will pay money to access the content. In other words, the user will pay for access to the live video stream, the highlight files, the match metadata information and/or authored content. This may be as a one-off payment for a particular period of time (for instance one match, a season of matches etc) or it may be in the form of a subscription. Additionally, other combinations of content access are envisaged such as paying only for access to the highlight files.

Security of Content

As the PSP 50 can access the content when money is paid, the security of the content needs to be considered. In other words, only people entitled to view the content should be able to view the content during a time and or at a place selected by the content provider.

This kind of scenario is particularly difficult to manage in a multi-cast environment because it is difficult to direct decryption keys to individual users. The security of the content transmitted to the user devices 50 will next be described. Broadly speaking securing the content has two components. The first component is to make it increasingly difficult for unauthorised people who have not paid to view the content. The second component is to control where and when authorised users can view the content.

In order to address the first component, in embodiments the WPA decryption key is provided to each user device 50 on the UMD. This has two distinct advantages. Firstly, by securing access to the Wireless Network, unauthorised users who try to "snoop" will not be able to gain access to the Wireless Network. Secondly, and as noted earlier, the UMD 53 is secure insofar as the data stored thereon is itself encrypted. Therefore, it is highly unlikely that an unauthorised individual will be able to extract the WPA decryption key from the UMD 53 and store the WPA decryption key in an unauthorised user device, and so reducing the likelihood of an unauthorised user gaining access to the network.

In order for the content provider to reduce the likelihood of individuals subscribing to the content for a short period of time and then continuing to access the Wireless Network after their subscription has expired, the UMD 53 can be re-distributed to the authorised users periodically (for instance once every three months, every season etc) including a new initial WPA decryption key. After the re-distribution of the UMD 53, the initial WPA encryption key used by the APs on the network would be correspondingly changed.

Figure 4:
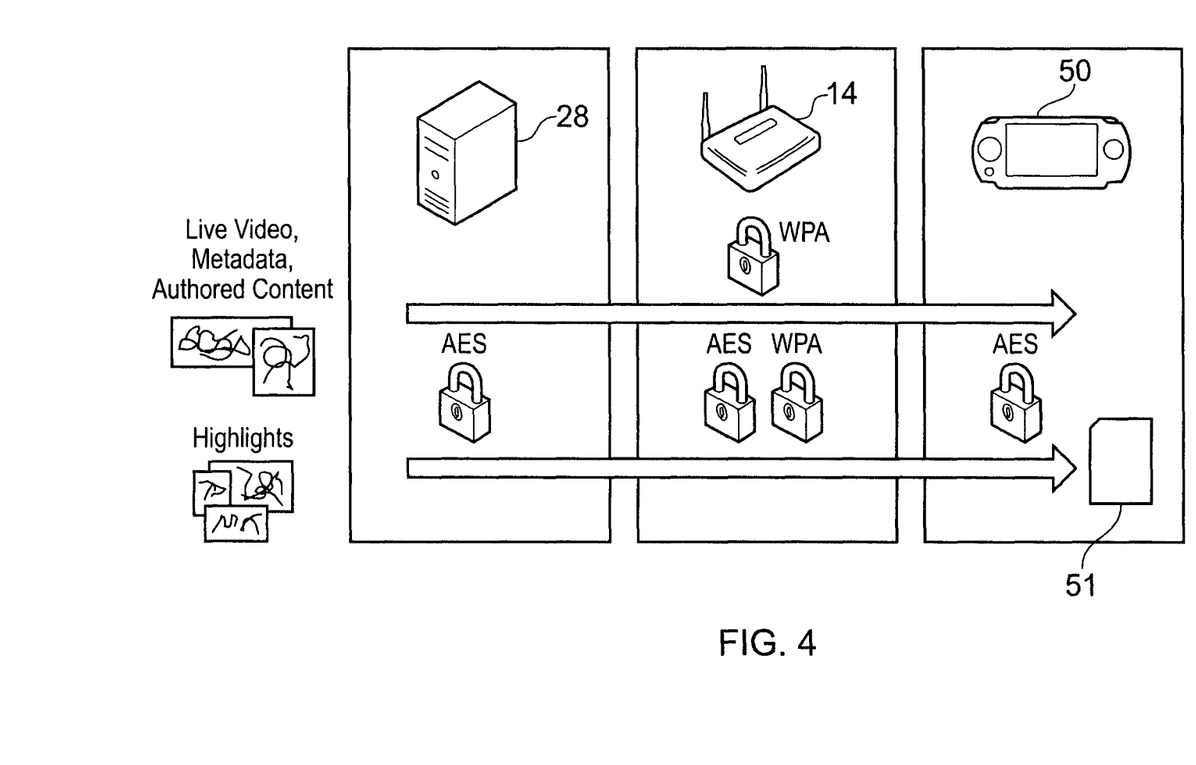
FIG. 4 shows a schematic diagram of the encryption process used in an embodiment of the system of FIGS. 1 and 2.

The second component will be described with reference to FIGS. 4 and 5. The streaming workstation 28 encrypts the video highlight file using the AES key before being fed to the router 40 for transmission over the Wireless Network. The WiFi APs (only one of which is shown in FIG. 4 for clarity) 14 re-encrypt the AES encrypted video highlight stream using the WPA key before transmission over the network. Additionally, the packetised live video stream, the metadata content and the authored content are also encrypted using only the WPA key. The WPA encrypted content is then multi-cast over the network to all the PSPs 50.

An authorised PSP 50 uses the WPA decryption key stored on the UMD (or subsequently updated by the network) to decrypt the WPA encrypted content. The AES encrypted highlight stream is then stored on the Memory Stick Pro Duo 51. Additionally stored on the PSP 50 authorised to view the AES encrypted content is the AES decryption key. This is re-transmitted to the PSP 50 by the network periodically. It should be noted here that the AES decryption key is stored on Volatile Memory 59 within the PSP 50. Thus, if power to the PSP 50 is removed, the AES decryption key is deleted. However, as the AES decryption key is transmitted over the Wireless Network periodically, if a user were to accidentally switch the PSP off during the soccer match, the AES key will be received again after a short period of time and so video highlights will become available once again. This gives the user flexibility to switch off the PSP 50 during a game should they wish.

In order to stop other users not authorised to view the AES encrypted content from using the multi-cast AES decryption key, each user device 50 must register with the content provider to have use of the AES-key. This registration, in embodiments, will take place before the match and will be described below with reference to FIG. 5. Of course, the registration can take place during the match, or before a match at the stadium.

Figure 5:
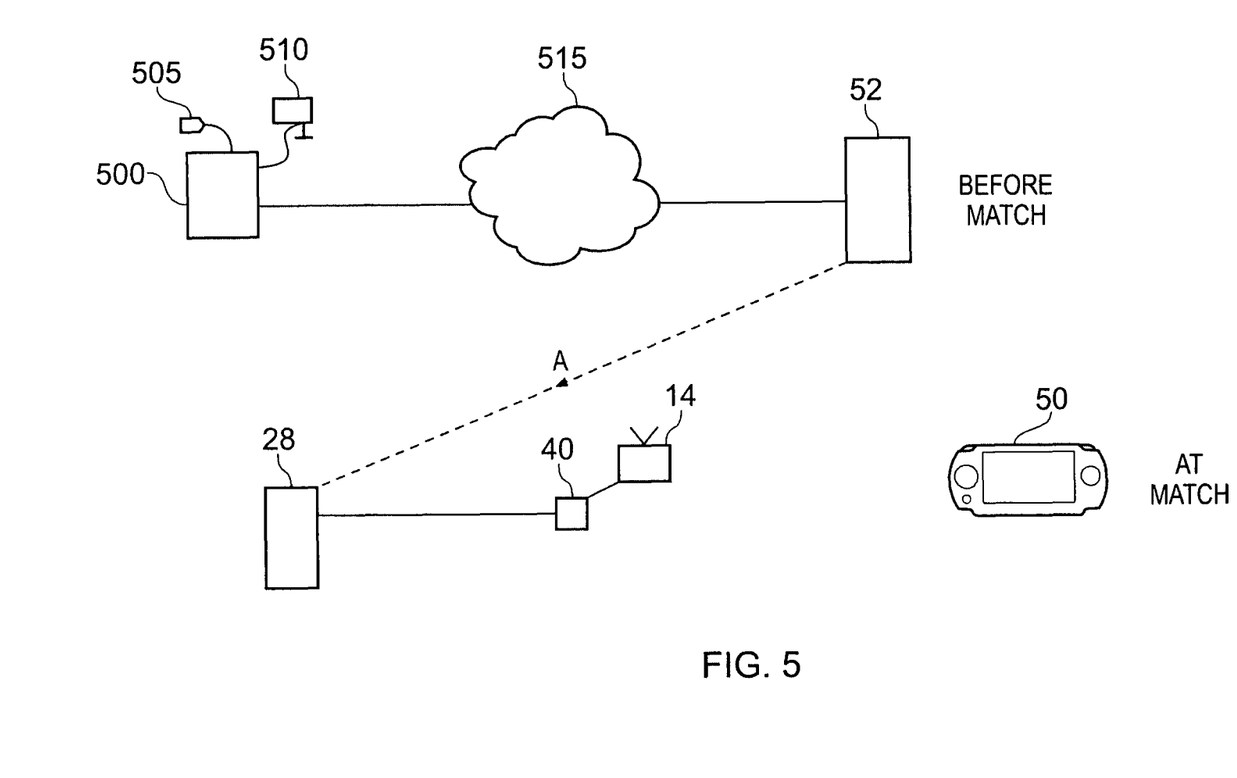
FIG. 5 shows a schematic diagram of the transfer of a decryption key used to decrypt the content encrypted using the encryption process of FIG. 4.

In FIG. 5, the user of the PSP 50 logs onto an Internet Server 52, via the Internet 515, using a computer 500. The computer is connected to a user input 505 such as a keyboard and a mouse. The computer also has a display 510 connected thereto. The Internet Server 52 holds information relating to each event. In particular, the Internet Server 52 stores a number that is unique to each event. When the user logs on to the Internet Server 52, they are prompted to provide the details of the match they are interested in attending and for which they want access to the AES encrypted content. The user is then prompted to provide payment details for access to the chosen service such as access to the highlight video clips at that match. Upon successful payment, a unique 12 digit code is passed to the computer 500 and is consequently displayed to the user on the display 510. The user notes this number or it may be directly stored in the PSP, if the PSP is connected to the computer. The unique 12 digit code is passed, from the Internet Server 52 to the streaming workstation 28 via path A.

At the match, the user inserts the UMD 53 having the WPA key into the PSP and switches the PSP on. The PSP automatically runs the software stored on the UMD 53. This software enables the IEEE 802.11b device in the PSP. The user thus gains access to the network via the WiFi AP 14 and using the initial WPA key stored on the UMD 53. The PSP 50 then prompts the user to enter the 12 digit code. The 12 digit code is passed, via the WiFi AP 14 and the router 40, to the streaming workstation 28. Additionally, the PSP passes a unique ID which uniquely identifies each PSP and is attributed to the PSP at the time of manufacture. The streaming workstation 28 then checks whether the 12 digit code was passed to it by the Internet Server 52 and is thus valid. Additionally; the streaming workstation 28 determines the level of access for which the user has paid. The streaming workstation 28 stores the unique 12 digit code in association with the unique ID of the PSP. If the 12 digit code is valid, the streaming workstation 28 sends an acknowledgment to the PSP 50. The acknowledgement includes an indication as to the level of access that should be given to the PSP.

As previously noted, the AES decryption key is broadcast periodically over the Wireless Network. The PSP 50 however only stores the AES decryption key from the Wireless Network if the PSP 50 receives the acknowledgment from the streaming workstation 28.

Thus, by storing the 12 digit code in association with the unique ID of the PSP 50, the access provided to the AES encrypted content is strictly controlled. In other words, a user cannot let his or her friend also input the code into his or her PSP 50 to gain unauthorised access to the content. This is because if the same 12 digit code is entered by a different user, the streaming workstation 28 will not grant access unless the unique ID is the same as the unique ID previously associated with the 12 digit code. This is particularly useful in a multi-cast network where the same encrypted data is transmitted to many users and so potentially many hundreds of unauthorised users could access content having only a single 12 digit code. Moreover, because the PSP is controlled by software stored on the UMD, and that this is secure, it is not possible for a user to gain unauthorised access to either the network or the AES encrypted content by re-programming the software stored on the UMD 53.

In the above example, the prevention of unauthorised access to the AES decryption key is described. However, it may also be possible to prevent any unauthorised access to any content is the correct acknowledgement is not received at the PSP 50. Additionally, the level of access can be varied depending on the acknowledgement received at the PSP 50.

It should be noted that, in some embodiments; at a predetermined time the Wireless Network multi-casts a separate destroy signal to the user devices 50. In response to the destroy signal, the PSP 50 in one example deletes the encrypted content, or corrupts the content in such a way that the content is destroyed. Additionally, or alternatively, in embodiments the AES decryption Key used to decrypt the encrypted content is destroyed. The term "destroy" means to either to delete, or to corrupt (reversibly or non-reversibly) the content or the AES decryption key. The destroy signal is transmitted at a predetermined period after the match or an appropriate time during the match, for instance at the full-time whistle. In this case, the destruction of the content or decryption key is linked to the match clock. Once the PSPs 50 receive this signal, the encrypted highlights and/or decryption key stored on the Memory Stick Pro Duo 51 are destroyed. It is noted that the transmission of the destroy signal is only one way to destroy the video highlights. For instance, the PSP 50 may be configured to automatically destroy the stored highlight files at a predetermined time. However, this does not allow for a delayed kick-off and so could mean that the stored highlight files are destroyed at an inopportune moment. Additionally, the PSP 50 could destroy the stored video highlight files a predetermined time after reception of a start signal multi-cast over the Wireless Network. This would mitigate the effects of a late kick-off.

However, if a user were to leave the match early or remove the Memory Stick Pro Duo 51 from the PSP before reception of the destroy signal, the user could conceivably view the highlight files at any time on their PSP. However, as noted earlier, the AES decryption key is alternatively or additionally periodically destroyed in the PSP 50 and retransmitted by the Wireless Network. Thus, if a user leaves the stadium 10, the AES decryption key used to decrypt the highlight files would, after a short period of being out of range of the Wireless Network, be destroyed in the PSP. Therefore, it would not be possible for the user to view the highlight files after the user departs the stadium 10. Indeed, in one embodiment, the PSP 50 is configured such that if the Memory Stick Pro Duo 51 is removed from the PSP 50, the PSP 50 detects this removal and automatically destroys the AES decryption key Moreover, as the AES decryption key is stored separately from the Memory Stick Pro Duo 51, the user would not be readily able to obtain the AES decryption key from the PSP 50.

It is possible that the AES decryption key (or content) could be destroyed if the PSP 50 was a certain distance from the wireless network. In order to establish the distance from the wireless network, the strength of the received signal can be measured and the distance calculated using this measure. If the distance between the PSP 50 and the wireless network (indicated by the received signal strength dropping below a threshold level), then the content or AES decryption key will be destroyed.

Further it is possible for one WiFi AP to be located at the exit to the stadium 10. This WiFi AP will continuously transmit the destroy signal. In this case, as this WiFi AP would be a large distance from the event, only people leaving early would pass into range of this AP, and thus destroy the highlight files. Accordingly, using the above techniques, the content provider has the ability to control temporally and spatially the viewing of the highlight files by a user. Although the foregoing has been explained with reference to highlight files, the invention is not so limited and the management of any amount or type of data and/or content may equally be performed. The degree of access will be decided when the user logs onto the Internet Server 52, and the unique code will be indicative of the degree of access. Moreover, although the foregoing has been described with reference to a 12 digit code, a code indicating a group or even a single code for the entire stadium is also envisaged. Also, although the 12 digit code has been distributed by the Internet, it could equally be distributed by mail or any other secure means.

Additionally, the AES decrypted data may be written to a so-called "secure environment". In the secure environment, features that would allow the AES decrypted content to be copied are removed. For instance, a Universal Serial Bus interface will be disabled to stop a user copying the AES decrypted content to a removable Flash Drive. Additionally, Television Out (TVOUT) sockets wilt be disabled in the secure environment.

Metadata Generation

As noted earlier, events are logged by the event logging workstation 30. In response to the logged events transferred to the streaming workstation 28, metadata is generated. Metadata is a term that means data about data. In other words, and in this case, metadata is data that represents any information related to an event in the match.

Figure 6:
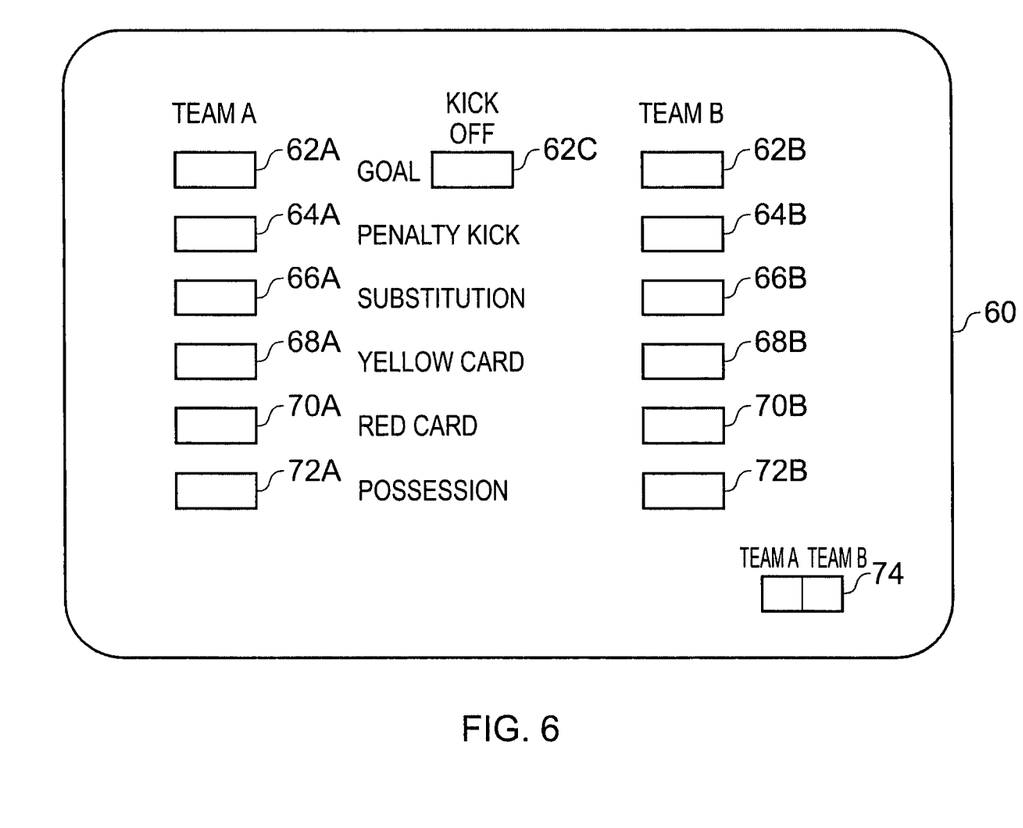
FIG. 6 shows an interface used for generating an event signal in a system of FIGS. 1 and 2.

Referring to FIG. 6 which shows the user interface 60 of the event logging workstation 30. The user is provided with an input device such as a keyboard, touch screen and/or mouse (not shown). Additionally provided to the event logging workstation user is audio commentary of the match, although this is optional. The user interface 60 has a number of selection buttons for team A 62A-72A and a number of selection buttons for team B 62B-72B. These selection buttons include kick off 62C, goal 62A, 62B, penalty kick 64A, 64B, substitution 66A, 66B, yellow card 68A, 68B, red card 70A, 70B and possession 72A, 72B. In other words, each selection button indicates an event occurring at the match; some of the events will trigger a highlight to be generated and some will merely update the statistics of the match stored as the match metadata. At the start of the match, the user of the event logging workstation 30 selects the kick off selection button 62C. In response to this selection, the event logging workstation 30 generates and transfers a signal to the streaming workstation indicating this event. In response to this, the streaming workstation 28 starts an internal match clock indicating the present match time. During the match, if a player from Team A receives the ball, the event logging workstation user selects possession button 72A. The event logging workstation 30; in response to the selection of the possession button 72A, generates and transfers a signal to the streaming workstation 28 indicating this event. The match time at which Team A came into possession of the ball is stored by the streaming workstation 28 and the appropriate match metadata file stored within the streaming workstation is updated. If the player is then subsequently dispossessed by a player from Team B the event logging workstation user selects possession button 72B. Again, the event logging workstation 30, in response to the selection of possession button 72B generates and transfers a signal to the streaming workstation 28 indicating this event. The match time when the player from team B came into possession of the ball (and consequently the match time Team A were dispossessed) is stored by the streaming workstation 28 and the appropriate match metadata file stored within the streaming workstation 28 is updated. This continues throughout the match. Accordingly, although not an event to generate a highlight, details of the possession of each team and the general match statistics are easily derived by the streaming workstation 28. The match metadata file is loaded on to the data carousel.

However, when Team A scores a goal, the event logging workstation user selects goal button 62A. The goal indication 74 is updated. Again, the event logging workstation 30, in response to the selection of goal button 62A generates and transfers a signal to the streaming workstation 28 indicating this event. The match time at which the goal is scored is noted.

Additionally, the streaming workstation user then activates a goal drop down menu (not shown). From this, the streaming workstation user selects which player in Team A scored the goal. To assist the user of the streaming workstation 28, they are provided with match commentary. Additionally, only the players who are on the pitch are present on the goal drop down menu. The ordering of the players may be in numerical squad order or in any other order such as number of goals scored in the season or position on the pitch. It may be useful to have the players ordered in numerical squad order as the position on the list never changes. However, it is of a higher probability that a player who has scored many goals over the past season will score again so should be more easily accessible.

In addition, because a goal is an event that requires a highlight a video highlight file showing the goal is generated and loaded onto the data carousel. This will be explained hereinafter. The user of the streaming workstation 28 can type in some metadata describing the event which will also be attributed to the video highlight file.

Also, although not shown, the squad details of each team are displayed to the user of the streaming workstation 28. These are updated by the user of the streaming workstation 28 when the user of the event logging workstation indicates that a substitution is made or a red card is issued by the referee.

There are at least two distinct advantages with having the user interface 60 of the event logging workstation 30 laid out so that only one button is clicked to indicate that an event has occurred. The first is that event logging is normally very-subjective. This means that there may be discrepancies between the same event described by two different people which leads to ambiguous situations regarding whether an event is deemed to be a highlight depending on the user logging the event. However, having only one button removes the subjectivity from the user. Also, as typically the event logging workstation user previously typed in metadata, this meant that they could not concentrate so much on the match. Accordingly, they were more likely to look away from the match leading to the event logging workstation user having an increased likelihood of missing important events. However, in this case, as the event logging workstation user simply clicks an appropriate button to select the appropriate event this problem does not exist on the event logging workstation 28 of this embodiment. It is noted that the user interface 60 is only exemplary and that many other different forms of event may be recorded and highlights generated therefrom.

Streaming Workstation and Data Carousel

As noted earlier, the streaming-workstation 28 generates the highlight video file for loading onto the data carousel from the four input video feeds. The highlight video stream is generated on the basis of the events indicated by the event logging workstation 30. In the streaming workstation 28, ten seconds of video from the four input video-streams are stored to a storage device. When an event which requires the creation of a video highlight file is received from the event logging workstation 30, the ten seconds of video from each input video stream is formed into a video highlight file. Additionally, the five seconds of video from each video stream following the indication of the goal is also stored in a video highlight file. The user of the streaming workstation 28 then decides which of the four input video feeds to use as the content for the video highlight file to be transmitted to the PSPs 50. The highlights are then encrypted and placed on the data carousel. Associated metadata is then generated by the user of the streaming workstation 30 which is provided as an XML file with links to the selected highlight file. This is placed on the data carousel.

By having the user of the streaming workstation generate the metadata and highlight clip, the streaming workstation user confirms the validity of the event. This provides a "double check" to ensure the validity and correctness of the event. Also, the time in which a highlight file can be generated and distributed using this method is reduced because the highlight files are generated automatically by the streaming workstation 28 immediately upon receipt of the event signal and so the user of the streaming workstation can concentrate on generating the metadata. Clearly, on some occasions using this method, no highlights may be distributed for editorial reasons, such as the highlight does not contain any or little entertainment value.

Also, when a certain number of highlight files are generated, the user of the streaming workstation 28 may generate a rolling highlights stream over the network. In other words, the highlight files generated to date may be edited together so as to have the appearance of a video feed.

The streaming workstation 28 also receives further information from the external metadata logger 33. This external metadata logger 33 receives information from other soccer matches that are occurring simultaneously around the country. This information may consist of goals, goalscorers, final score etc. This information is used to generate an XML file for each category of information which is fed to the streaming workstation 28. This information is also used to generate a live league table. As goals are scored in different matches, the live league table changes. The generated live league table is also stored as an XML file and is fed to the streaming workstation 28 for loading onto the data carousel. Additionally provided by the external metadata logger 31 is a league table showing the position of each team in the league prior to the kick-off of the present soccer match, The XML files sent to the streaming server 28 are then distributed to the PSPs 50 using the data carousel.

The highlight video files will consist of extracts of the video stream that, in the soccer match, include goals, penalty kicks, red and yellow cards, substitutions etc; these extracts being categorised as "highlight types". In other words, the highlight video files will show highlight video clips showing an event logged by the event logging workstation 30 from any one, or any number of the video streams provided by the content processing workstation 26. The decision as to which video feed to use will be made by the streaming workstation user depending upon which video feed best captures the event. Although the foregoing assumes a user will control the production of the highlight stream, this is not limiting. For instance, the generation of the event may allow the generation of the highlight file to be made automatically. For instance, before the soccer match takes place, each camera position and thus video feed could be determined as providing the best capture of any particular incident. As one example, a camera located behind one goal keeper could be deemed to have the best view when a goal is scored past that goal keeper. Therefore, when an event indicating that a goal has been scored past that goal keeper is generated by the event logging workstation 30 and this is passed to the streaming workstation 28, the streaming workstation 28 automatically extracts video from the ten seconds before and five seconds after the generation of the event. This generates one highlight file. Although the foregoing has described the video in the highlight-file as beginning, ten seconds before the logged event until five seconds after the logged event, the invention is not limited. Indeed any predetermined time before or after the event may be used. Moreover, it need not be a predetermined time, but may be a predetermined time before and until a predetermined event, such as the selection of the kick off button 62C after a goal by the user of the event logging workstation 30 that may determine when the video in the highlight file will stop and the highlight file is generated.

As noted above, the streaming workstation 28 is also responsible for providing data to the data carousel. A data carousel is a way of distributing content to many devices in a multi-cast environment. In embodiments of the present invention, the data carousel is responsible for distributing the highlight files, the authored content files, the metadata files and initialisation data such as the skin arrangement for the user device interface. As noted, these files are in the XML format. This carousel data, when received, is stored on the Memory Stick Pro Duo 51. The data arranged on the data carousel is continually broadcast over the Wireless Network. After the data has been broadcast once, more data is added to the data carousel and the data (including the new data) is broadcast again. This means that if the user device did not receive all the data (notwithstanding the Forward Error Correction applied to the data put on the data carousel), then the user device may receive the missing packets on the repeat cycle.

In embodiments of the present invention, the order at which data is transmitted from the carousel is varied depending on a number of factors. Firstly, files which are larger in size relative to those which are to be on the data carousel in the repeat cycle (such as the highlight file) are converted into a number of smaller size files. This means that the likelihood of the highlight files being transmitted a similar-number of times to the smaller files is increased. This increases the chance of the user device, over any number of repeat cycles, of receiving the highlight file.

Secondly, as less people are accessing the Wireless Network for the first time after a certain period of the match (for instance 20 minutes), then the initialization data will be placed on the data carousel only every third repeat cycle. This means that the data that is placed on the data carousel is actively adjusted during the match to achieve more efficient use of the bandwidth available to the data carousel and that the data on the data carousel is determined to some extent by the likelihood of that data being required by the user devices.

Alternatively, the data carousel can apply a weighting to the files to be transmitted over the network. The weighting indicates the priority that a particular file is given; the higher the weighting, the higher the priority given to that file to be transmitted over the network by the data carousel. In this case, newly generated highlight files will be given a very high priority to ensure that they are multicast to PSPs very quickly after being loaded onto the data carousel. Once the highlight file has been transmitted over the network however, the weighting attributed to that highlight file is reduced and the weighting attributed to other files on the data carousel is increased. This ensures that other files on the data carousel waiting to be transmitted will eventually be transmitted. Also, the weighting of the data will be dependent upon the time at which the data is to be transmitted. Like the example above, as most spectators arrive at the stadium 10 either before or during the first ten minutes of the match, the weighting given to initialisation data will be higher at these times and will reduce after the first ten minutes of the match. This allows the initialisation data to be received by late arriving spectators, but will mean that other, more recently changed or added data, will be given a higher priority and so will be sent first.

Allocation of User Device Software Between UMD and Memory Stick Pro Duo

As noted above, although the UMD 53 stores the software which is to be run on the PSP 50 because the UMD 53 is secure, it may be useful to provide other code (which is to be used in conjunction with, but not adapt, the software on the UMD 53). This, as noted above, is termed supplemental display data and is stored on the Memory Stick Pro Duo 51. In particular, the code loaded on the Memory Stick Pro Duo 51 will be provided over the Wireless Network. In this case, the code to be stored on the Memory Stick Pro Duo 51 will be provided by the streaming workstation 28 and will be placed on the data carousel. The code will be thus WPA encrypted to provide an element of security; the WPA decryption key being stored on the UMD 53.

In one embodiment, the UMD 53 will only store information necessary to provide access to the Wireless Network and only the rudimentary pieces of software such an eXtended Markup Language (XML) interpreter, codecs for viewing video, basic interface controls etc. The XML interpreter will be provided as the code passed over the Wireless Network will be sent in the XML format. Clearly, if another format of Language was used for the code, then the UMD 53 would need to provide an appropriate interpreter. The advantage with providing only the rudimentary information on the UMD 53 is to reduce the number of customised UMDs 53 needing production. This reduces the cost of production of each UMD 53. For instance, if the user device was used not just in soccer matches, but also for music concerts, then the requirements of the interface may be radically different; there will be no highlight file but may be a "greatest video" video file. The UMD 53 will therefore enable the PSP to connect to the Wireless Network, and the appropriate interface for the event will be downloaded from the data carousel.

In another embodiment, the UMD 53 may provide all the information of the above embodiment, but may include less rudimentary information, such as an "interface skeleton" in XML. This is advantageous because this reduces the amount of information needing to be transmitted over the data carousel, and therefore network resources. However, there is an element of flexibility in the customisation of the interface. This embodiment would be particularly advantageous where a similar layout is required for a number of different scenarios, but where the "skin" of the user interface is to be changed. The term "skin" refers to computer readable code which defines the look and feel of a graphical user interface (GUI) whilst retaining the same or similar GUI functionality, and the term "interface skeleton" refers to computer readable code which defines the basic layout and functionality of a GUI. For instance, in soccer matches the layout of the user interface would be similar for all matches and so have the same interface skeleton (highlight video file, authored content etc), but the "skin" may contain the colours of the home team or the team colours of the user's favourite team. This is advantageous over the situation where the UMDs are fully customised because mass-production of the UMDs 53 reduces the cost of individual UMDs 53.

In another embodiment, each UMD 53 is customised for each soccer season. This has the advantage of reducing network resources because only the basic information (such as current match details) need to be passed over the Wireless Network by the data carousel. Additionally, other large amounts of information such as in-depth details of players, the fixtures for the season etc can be provided easily on the UMD 53.

User Feedback

In order to allow the user of the PSP 50 to provide feedback, in some embodiments, a questionnaire facility is provided. The feedback questionnaire is in the XML format and placed on the data carousel during a period of reduced network traffic. This may be at the start of the soccer match, or at half time. The questionnaire is stored on the Memory Stick Pro Duo 51. Additionally, during the match, the selections made by the user, and time spent on each selection, are logged on the Memory Stick Pro Duo 51. For instance, the user may view only different highlight video clips for the entire first half, then at half time may have switched to the live stream. However, after only 5 minutes of the second half, the user may switch back to viewing different highlight video clips. The user thus never viewed any authored content.

The questionnaire includes simple questions requiring very little user input. For instance, the questionnaire may ask "did you like the system?", "did you find the authored content useful?" etc. The user will then be asked to provide their answer using one of the selection buttons. The user will be able to answer "yes", "no" or "not used". Therefore in the scenario described above, if the user answered that he or she found the authored content useful, that would be an indication that the user did not reliably answer his or her questions. Therefore, the answers provided to the remaining questions would not be considered to be reliable. However, even though the user did not reliably answer the questions, by monitoring the user's selection it is possible to infer that the user did enjoy the highlight video stream more than the live stream. Thus, it is possible to infer two useful metrics from the questionnaire and from monitoring the selections made by the user. Firstly, it is possible to judge the reliability of the answers provided by the user and secondly, even if the user is not reliable, it is possible to infer certain preferences of the user.

In order to pass this information back to the provider, there are two possible options. The first is to utilise the reduced network traffic by instructing each of the PSPs work in infrastructure mode rather than multi-cast mode upon receipt of an appropriate instruction over the network. This could occur at half time or after final whistle. In other words, so the PSPs 50 can pass all the information to the content provider over the Wireless Network. The other option is for the providers to download this information from the PSPs 50 at the end of the event. This may require a wired connection using the Universal Serial Bus (USB) connection on the PSP or ensuring that the Memory Stick Pro Duo 51 is passed to the content provider to download the questionnaire. In other examples, it is also possible that the questionnaire answers to be passed back to the content provider without the browsing history, or the browsing history can be provided-without the questionnaire answers.

In the embodiments that have been implemented on a processor controlled device or system, it is envisaged that the processor will be configured to run using computer readable instructions. These computer readable instructions are provided as a computer program; the program being provided on a storage medium. The storage medium may be an optically readable medium, a magnetically readable medium, a signal or any other type of transmission medium. Further, it is envisaged that the embodiments may take place over a Network, such as the Internet or a Very Large Area Network.

Although the foregoing has been described with reference to PSPs, other portable devices such as computer laptops, Personal Digital Assistance or other devices that are operable in a user's hand, are also envisaged.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of distributing software used to control a portable client device and supplemental display data operating under the control of the software and used to configure the display of the portable client device, the portable client device being connectable to a multi-cast network, the method comprising the steps of:
   providing a pre-recorded recording medium containing the software and a first decryption key, said software and first decryption key enabling the portable client device to connect to the multi-cast network;
   receiving from the multi-cast network, following connection thereto by the portable client device, said supplemental display data and a second decryption key, the second decryption key being re-transmitted by the multi-cast network periodically and used to decrypt the supplemental display data;
   storing, in a data storage device located in the portable client device that is separate from the pre-recorded recording medium, the supplemental display data;
   storing, in a volatile memory located in the portable client device, the second decryption key;
   graphically representing, on the portable client device, said supplemental display data using said software stored on the pre-recorded medium; and
   destroying at least one of the supplemental display data and the second decryption key in response to receiving at a predetermined time, from the multi-cast network, a signal which commands the portable client device to destroy at least one of the supplemental display data and the second decryption key or when the portable client device moves out of a range of the multi-cast network.

2. A method according to claim 1, wherein the software comprises an interpreter to run the supplemental display data.

3. A method according to claim 1, wherein the software comprises a markup language interpreter and the supplemental display data is written in a corresponding markup language.

4. A method according to claim 1, wherein the software comprises a user interface skeleton which, when loaded onto the client device, configures the portable client device to provide user interface functionality.

5. A method according to claim 4, wherein the supplemental display data comprises a user interface skin which, when loaded onto the portable client device, configures the portable client device to provide a user interface skin on the user interface skeleton.

6. A portable client device being controlled by software and being connectable to a multi-cast network, the portable client device comprising:
   a network interface operable to be connected to the multi-cast network;
   a pre-recorded data reader operable to read, from a pre-recorded recording medium, said software controlling the portable client device and a first decryption key to connect to the multi-cast network;
   a receiver operable to receive via the network interface and from the multi-cast network following connection thereto by the portable client device, supplemental display data operating under the control of the software and used to configure the display of the portable client device and a second decryption key, the second decryption key being re-transmitted by the multi-cast network periodically and used to decrypt the supplemental display data;
   a storage medium located in the client device that is separate from the pre-recorded recording medium operable to store the supplemental display data;

a volatile memory configured to store the second decryption key; and a display configured to graphically represent said supplemental display data using said software stored on the pre-recorded medium, wherein the portable client device is configured to destroy at least one of the supplemental display data and the second decryption key in response to receiving at a predetermined time, from the multi-cast network, a signal which commands the portable client device to destroy at least one of the supplemental display data and the second decryption key or when the portable client device moves out of a range of the multi-cast network.

7. A portable client device according to claim 6, wherein the software comprises an interpreter operative to run the supplemental display data.

8. A portable client device according to claim 6, wherein the software comprises a markup language interpreter and the supplemental display data is written in the corresponding markup language.

9. A portable client device according to claim 6, wherein the software comprises a user interface skeleton which, when loaded onto the portable client device, configures the portable client device to provide user interface functionality.

10. A portable client device according to claim 9, wherein the supplemental display data comprises a user interface skin component which, when loaded onto the portable client device, configures the portable client device to provide a user interface skin on the user interface skeleton.

11. A portable client device according to claim 6, wherein the data storage device is removable from the portable client device.

12. A non-transitory computer readable medium including computer executable instructions, wherein the instructions, when executed by a portable client device being controlled by software and being connectable to a multi-cast network, cause the portable client device to perform a method comprising:

reading, from a pre-recorded recording medium, said software controlling the portable client device and a first decryption key to connect to the multi-cast network;

receiving, via a network interface and from the multi-cast network following connection thereto by the portable client device, supplemental display data operating under the control of the software and used to configure the display of the portable client device and a second decryption key, the second decryption key being re-transmitted by the multi-cast network periodically and used to decrypt the supplemental display data;

storing, at a storage medium located in the portable client device that is separate from the pre-recorded recording medium, the supplemental display data;

storing, at a volatile memory of the portable client device, the second decryption key;

graphically representing, at a display, said supplemental display data using said software stored on the pre-recorded medium; and destroying at least one of the supplemental display data and the second decryption key in response to receiving at a predetermined time, from the multi-cast network, a signal which commands the portable client device to destroy at least one of the supplemental display data and the second decryption key or when the portable client device moves out of a range of the multi-cast network.

* * * * *